United States Patent

Murabayashi

[11] Patent Number: 5,805,369
[45] Date of Patent: Sep. 8, 1998

[54] DIGITAL SIGNAL REPRODUCING APPARATUS FOR WRITING NULL DATA

[75] Inventor: Noboru Murabayashi, Saitama, Japan

[73] Assignee: Sony Corporation, Tokyo, Japan

[21] Appl. No.: 774,897

[22] Filed: Dec. 27, 1996

Related U.S. Application Data

[63] Continuation of Ser. No. 442,359, May 16, 1995, abandoned.

[30] Foreign Application Priority Data

May 17, 1994 [JP] Japan .................................. 6-126753

[51] Int. Cl.$^6$ .............................. G11B 5/09; G06F 11/00; H04N 5/91
[52] U.S. Cl. .............................. 360/53; 386/75; 386/104; 371/5.1; 371/30
[58] Field of Search .............................. 360/19.1, 32, 53; 375/241, 242; 386/39, 54, 75, 96, 104; 371/30, 5.1

[56] References Cited

U.S. PATENT DOCUMENTS

| | | | |
|---|---|---|---|
| 4,774,605 | 9/1988 | Kato | 360/72.2 |
| 4,872,171 | 10/1989 | Wakumura et al. | 371/40.1 |
| 4,928,185 | 5/1990 | Kobayashi et al. | 360/19.1 |
| 4,943,872 | 7/1990 | Yamazaki | 360/8 |
| 5,414,568 | 5/1995 | Taki et al. | 360/19.1 |
| 5,548,595 | 8/1996 | Hirayasu | 371/5.5 |

FOREIGN PATENT DOCUMENTS

| | | |
|---|---|---|
| 0 155 101 | 9/1985 | European Pat. Off. . |
| 0 310 442 | 4/1989 | European Pat. Off. . |
| 0 509 594 | 10/1992 | European Pat. Off. . |
| 405040583A | 2/1993 | Japan . |

OTHER PUBLICATIONS

Patent Abstracts of Japan vol. 018 No. 629 (E–1637), 30 Nov. 1994, JP–A–06 244807 (Sony Corp) 2 Sep. 1994.

*Primary Examiner*—Aristotelis M. Psitos
*Assistant Examiner*—Regina Y. Neal
*Attorney, Agent, or Firm*—Frommer Lawrence & Haug LLP; William S. Frommer; Dennis M. Smid

[57] ABSTRACT

To easily reproduce data even in variable speed reproduction mode as with normal reproduction mode. Data read from a magnetic tape 1 is supplied to a reproduction equalizing portion 4 through a reproducing amplifier 3. The reproduction equalizing portion 4 trims wave shape and supplies the resultant signal to a data determining comparator 5. The data determining comparator 5 digitizes the input signal. The digitized data is supplied to a reproduction clock extracting portion 7. The reproduction clock extracting portion 7 extracts a reproduction clock. The extracted clock is supplied to a reproduction data strobe portion 6. The reproduction data strobe portion 6 supplies the digitized data to an error correcting portion 8 in synchronization with the reproduction clock. The error correcting portion 8 generates an error correction flag, an interpolation flag, and so forth. A reproduction signal processing portion 10 and a memory 9 process signals and output a sound signal through a D/A converting portion 11.

9 Claims, 12 Drawing Sheets

Fig. 6

|  | BA 1 | BA 2 | BA 3 | BA 4 | BA 5 |  | BA10 | BA11 | BA12 | BA13 | BA14 |
|---|---|---|---|---|---|---|---|---|---|---|---|
| SA 1 | ID0 |  |  |  |  |  |  |  |  |  |  |
| 2 | ID1 |  |  |  |  |  |  |  |  |  |  |
| 3 |  |  |  |  |  |  |  |  |  |  |  |
| 4 |  |  |  |  |  |  |  |  |  |  |  |
| 5 |  |  |  |  |  |  |  |  |  |  |  |
| 6 |  |  |  |  |  |  |  |  |  |  |  |
| 7 |  |  |  |  | E/D  ID |  |  |  |  |  | E/D  ID |
| 8 |  |  |  |  |  |  |  |  |  |  |  |
| 9 |  |  |  |  |  |  |  |  |  |  |  |
| 10 |  |  |  |  |  |  |  |  |  |  |  |
| 11 |  |  |  |  |  |  |  |  |  |  |  |
| 12 |  |  |  |  |  |  |  |  |  |  |  |
| 13 | L0   u | L10  u | L20  u | L30  u | L40  u |  | L5   u | L15  u | L25  u | L35  u | L45  u |
| 14 | 1 | 1 | 1 | 1 | 1 |  | 1 | 1 | 1 | 1 | 1 |
| 15 | L50  u | L60  u | L70  u | L80  u | L90  u |  | L55  u | L65  u | L75  u | L85  u | L95  u |
| 16 | 1 | 1 | 1 | 1 | 1 |  | 1 | 1 | 1 | 1 | 1 |
| 17 | L100 u | L110 u | L120 u | L130 u | L140 u |  | L105 u | L115 u | L125 u | L135 u | L145 u |
| 18 | 1 | 1 | 1 | 1 | 1 |  | 1 | 1 | 1 | 1 | 1 |
| 19 | L150 u | L160 u | L170 u | L180 u | L190 u |  | L155 u | L165 u | L175 u | L185 u | L195 u |
| 20 | 1 | 1 | 1 | 1 | 1 |  | 1 | 1 | 1 | 1 | 1 |
| 21 | L200 u | L210 u | L220 u | L230 u | L240 u |  | L205 u | L215 u | L225 u | L235 u | L245 u |
| 22 | 1 | 1 | 1 | 1 | 1 |  | 1 | 1 | 1 | 1 | 1 |
| 23 | L250 u | L260 u | L270 u | L280 u | L290 u |  | L255 u | L265 u | L275 u | L285 u | L295 u |
| 24 | 1 | 1 | 1 | 1 | 1 |  | 1 | 1 | 1 | 1 | 1 |
| 73 | L1500 u | L1510 u | L1520 u | L1530 u | L1540 u |  | L1505 u | L1515 u | L1525 u | L1535 u | L1545 u |
| 74 | 1 | 1 | 1 | 1 | 1 |  | 1 | 1 | 1 | 1 | 1 |
| 75 | L1550 u | L1560 u | L1570 u | L1580 u | L1590 u |  | L1555 u | L1565 u | L1575 u | L1585 u | L1595 u |
| 76 | 1 | 1 | 1 | 1 | 1 |  | 1 | 1 | 1 | 1 | 1 |
| 77 | L1600 u | L1610 u | L1620 u | L1630 u | L1640 u |  | L1605 u | L1615 u | L1625 u | L1635 u | L1645 u |
| 78 | 1 | 1 | 1 | 1 | 1 |  | 1 | 1 | 1 | 1 | 1 |
| 79 | L1650 u | L1660 u | L1670 u | L1680 u | L1690 u |  | L1655 u | L1665 u | L1675 u | L1685 u | L1695 u |
| 80 | 1 | 1 | 1 | 1 | 1 |  | 1 | 1 | 1 | 1 | 1 |

Fig. 7

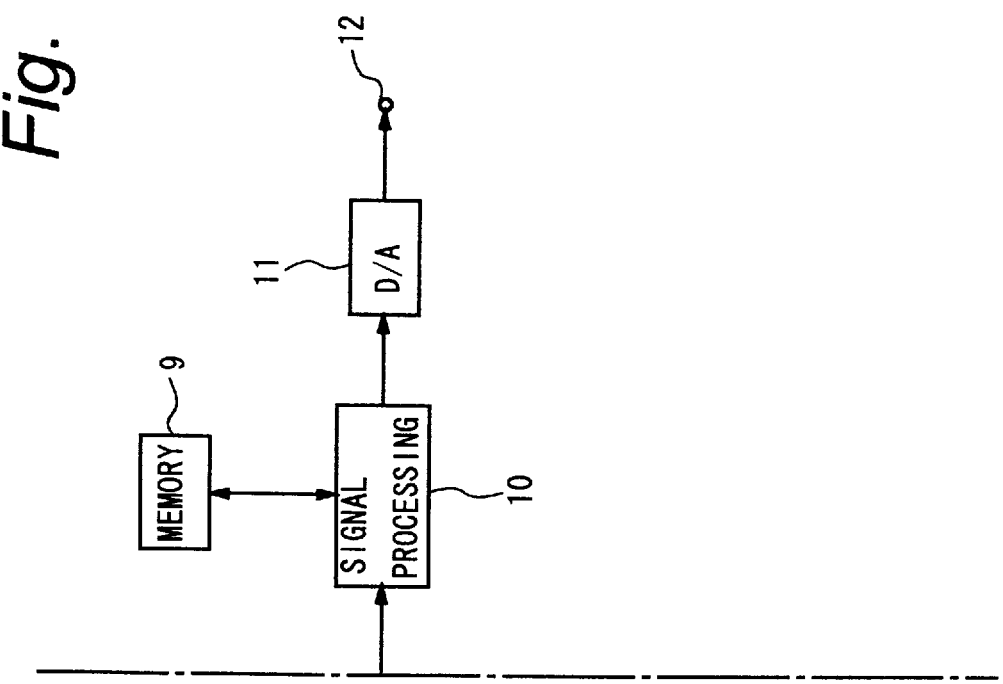

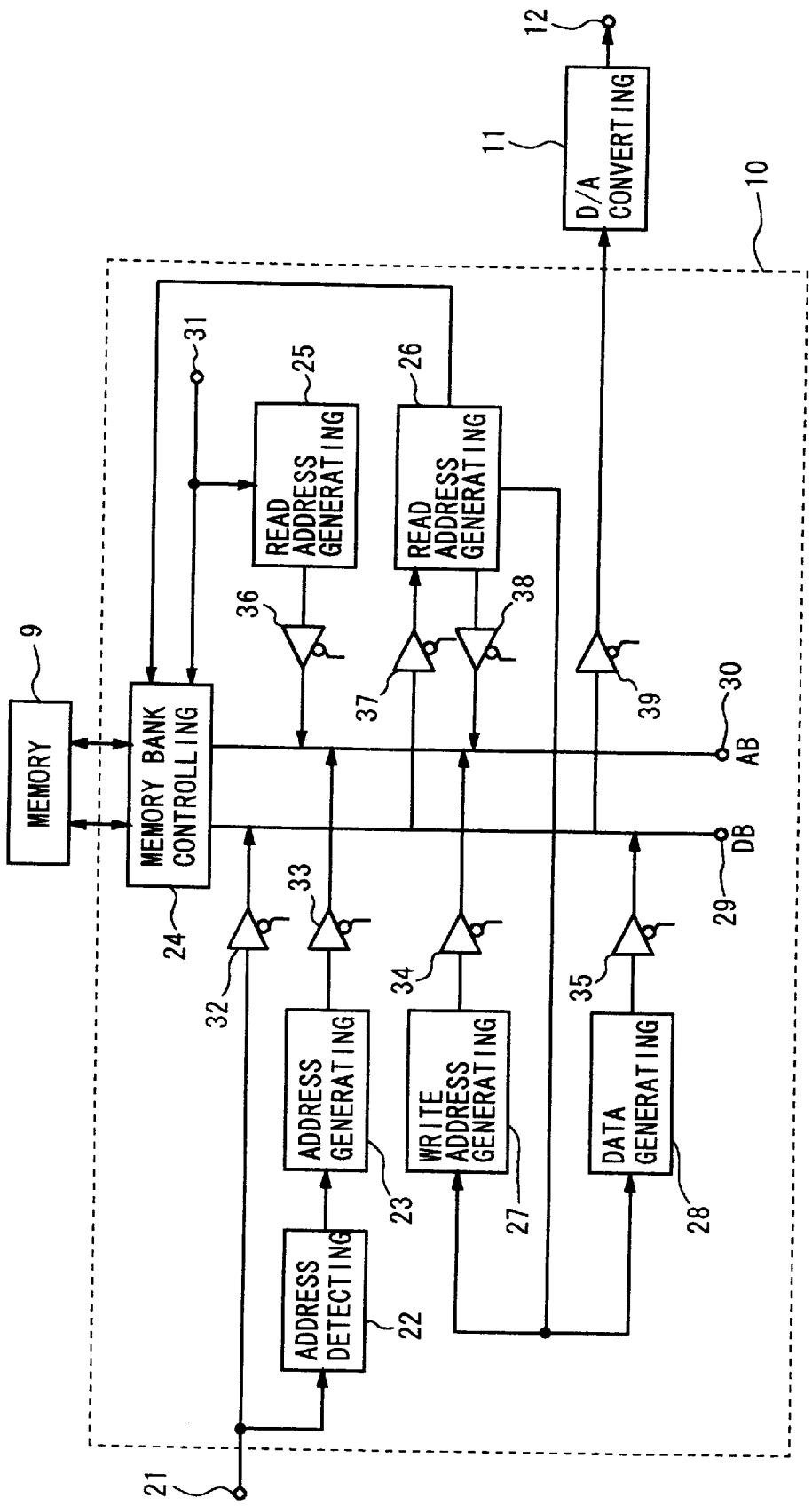

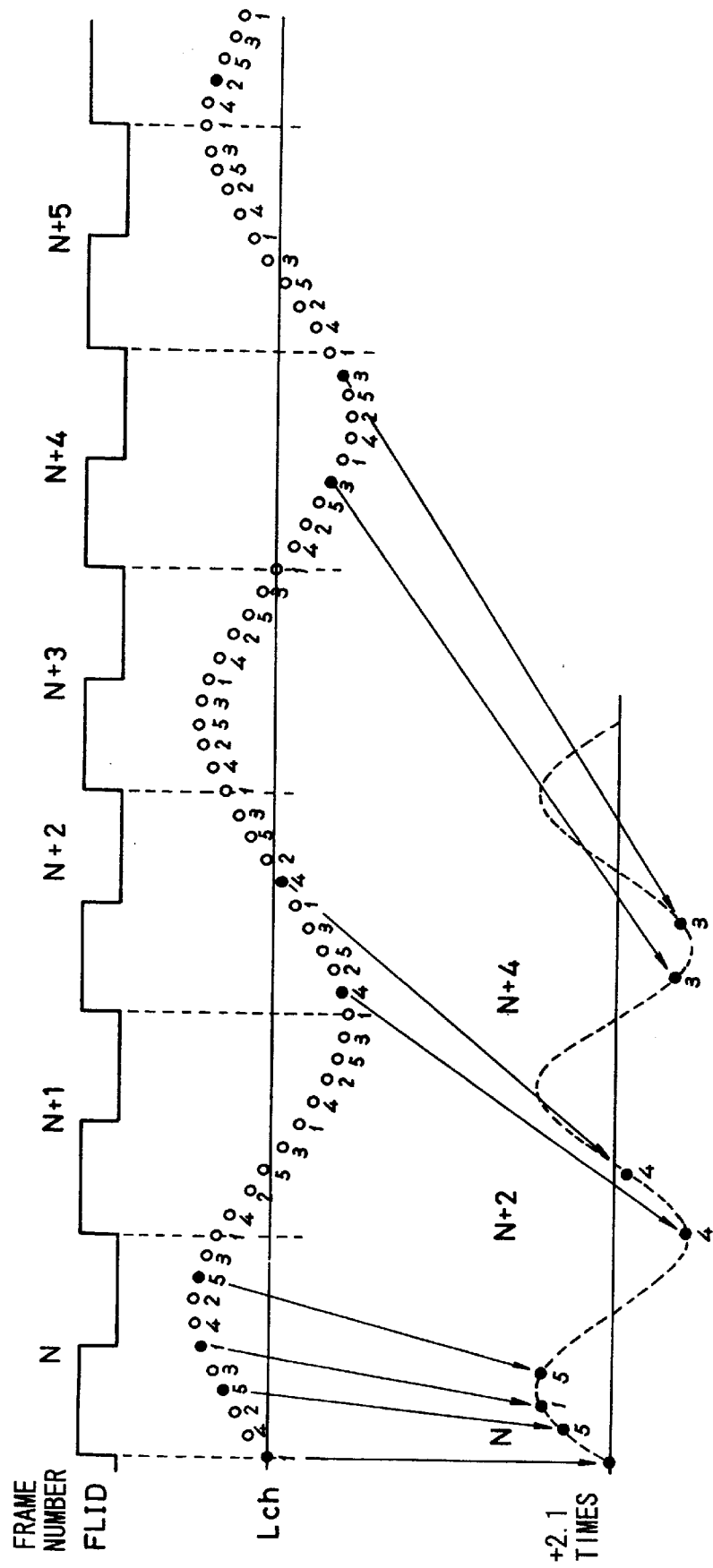

DIGITAL SIGNAL REPRODUCING APPARATUS FOR WRITING NULL DATA

This application is a continuation of application Ser. No. 08/442,359, filed May 16, 1995, which is now abandoned.

BACKGROUND OF THE INVENTION

1. Field of the Invention

The present invention relates to a digital signal reproducing apparatus for reproducing data of for example an audio PCM (Pulse Code Modulation) signal recorded on a recording medium through a rotating magnetic head.

2. Description of the Related Art

As an example of a digital signal reproducing apparatus, a DAT (Digital Audio Tape) is considered. In the DAT, record data is recorded on the recording medium in a two-track-paired interleave format. Thus, when data is reproduced at a double reproducing speed from the DAT, data at the same interleave region is selected and deinterleaved.

The applicant of the present invention has proposed a digital data recording apparatus that reproduces sound data that has been interleaved on more than two tracks as disclosed in Japanese Patent Application No. HEI 5-198782. FIGS. 1A and 1B are conceptual schematic diagrams showing an example of the structure of data for one frame. As shown in FIG. 1A, one frame is composed of ten tracks. Signals on L channel are recorded on tracks TR1 to 5. Signals on R channel are recorded on tracks TR6 to 10. These tracks are recorded on a magnetic tape as shown in FIG. 1B.

Now, assume the case that data of frames that have been interleaved is reproduced at a variable speed. When data is reproduced at +2.0 times variable speed, the reproducing magnetic head passes through the same track number for each frame. When image signals are reproduced, the position of a noise bar is fixed. To prevent such a problem, data is reproduced at +2.1 times speed.

FIG. 2 shows an example of a reproduction RF signal at +2.1 times speed in track pattern coordinate method. In FIG. 2, the horizontal axis represents time t and the vertical axis represents tape traveling amounts. The slope p=s/t in FIG. 2 represents reproducing speed. The dotted lines represent the +2.1 times reproducing speed. The solid lines represent standard reproducing speed. Numerals in FIG. 2 represent track numbers that identify tracks that have been interleaved. At this point, each of the widths of the recording head and the reproducing head is the same as the track pitch.

When the azimuth of the reproducing head is considered, the reproduction RF signal is represented in a parallelogram shape as shown in FIG. 2. The length in the vertical direction is proportional to the level of the reproduction RF signal. In other words, the ratio of the length of each side in the vertical direction of the parallelogram in the normal reproduction mode and the length of each side in the vertical direction of the parallelogram in the variable speed reproduction mode is equal to the ratio of reproduction levels.

Since sound data is recorded on the entering side of the magnetic tape, if the magnetic head travels from track TR1, as shown in FIG. 2, the signal levels of data on tracks TR1, TR5, TR8, and TR9 of the first reproduction frame and tracks TR2, TR3, TR6, TR7, and TR10 are 0 dB, −2.2 dB, −12 dB, −4.4 dB, −5.6 dB, −8.5 dB, −3.1 dB, −14 dB, and −1.4 dB, respectively.

Likewise, the signal levels of data on tracks TR4 and TR8 of the third reproduction frame and tracks TR1, TR2, TR5, TR6, and TR9 of the fourth reproduction frame are −1.4 dB, −3.1 dB, −8 dB, −6 dB, −5.2 dB, 10.5 dB, and −2.5 dB, respectively. The data on these tracks are reproduced.

FIG. 3 shows signal levels of reproduction RF signals for four frames including a reproduction frame at +2.1 times reproducing speed. In FIG. 3, the horizontal axis represents L/R channels and the vertical axis represents frame numbers of reproduction data. By considering error correction in the reproduction signal processing portion, it is assumed that signals with signal levels of up to −3.0 dB can be reproduced. Only signals of data in the same frame are processed. Signals reproduced in the first frame are processed.

On L channel, one of data on track TR1 or TR5 is reproduced in frame number N. On R channel, since the signal level of data on track TR9 in frame number N exceeds −3.0 dB, it is not reproduced. At this point, on R channel, data on track TR10 in the next frame N+1 is reproduced.

Likewise, on L channel, data on track TR4 in frame number N+2 is reproduced. On R channel, data on track TR9 in frame number N+3 is reproduced. On the next L channel, one of data on track TR3 in frame number N+4, data on track TR1 in frame number N+5, and data on track TR2 in frame number N+6 is reproduced. On R channel, one of data on track TR7 in frame number N+4 and data on track TR8 in frame number N+5 is reproduced.

On the next L channel, data on track TR1 in frame number N+9 is reproduced. On R channel, data on track TR6 in frame number N+7 is reproduced. Thus, at +2.1 times speed, only data on one track or two tracks are reproduced. Thus, the data amount at +2.1 times speed is ⅕ to ⅖ as low as that at the normal speed.

When deviation of tracking in variable speed reproduction mode and losses such as spacing loss in a tape/head portion are considered, reproduction data cannot be always reproduced with 100% accuracy. Data with a large loss is interpolated with preceding and following data corresponding to an interpolation flag received from an error correcting portion of a reproduction signal processing portion. On track TR1 in frame number N and on track TR3 in frame number N+4 that are represented by solid lines, sound data recorded at the beginning of the tape can be reproduced as with the case in the normal reproduction mode.

In the conventional signal processing method for the variable speed reproduction mode, the amount of data reproduced in the same frame is small. In addition, data with interpolation flag should be interpolated with reproduced data with small amount. The resultant signals cannot be properly recognized.

SUMMARY OF THE INVENTION

A digital signal reproducing apparatus having a non-integer relation between a sampling frequency of a digital information signal to be recorded and an inner interleave reference signal frequency and adapted for reproducing adjacent sample sequence data interleaved on non-adjacent tracks, comprising a signal process memory means for dividing a memory region into a plurality of regions and writing/reading data to/from the divided memory regions and a means for treating data that is A/D converted other than an error flag after a data read region of the memory region as null data and rewriting the data to a flag representing that all data is error data.

In the reproduction signal processing portion, a signal processing buffer memory is divided into a plurality of banks and data is read and written therefrom and thereto. At this point, after a data read region, all data that is supposed to be sent to an A/D converting portion is treated as null data. The error flag received from an error correcting portion of the reproduction signal processing portion is rewritten to a flag that represents that all data after the data read region is error data.

In a variable speed reproduction mode such as two times speed reproduction mode, regardless of whether or not data is in the same interleave region, data written in the memory is deinterleaved. When an error flag that represents that the data should be interpolated is received from the error correcting portion, a data read signal processing portion optimally interpolates data corresponding to the error flag.

In the variable speed reproduction mode, the address generating rate of an address counter is varied so as to read data written in the memory corresponding to the variable speed. Thus, sound signals can be easily heard.

According to the present invention, in the normal reproduction mode and in particular, variable speed reproduction mode, without need to change the reproduction signal processing method, a sound signal can be recognized as clearly as possible.

In addition to the case that the reliability of the interpolation flag received from the error correcting portion is low as in the variable speed reproduction mode, since all invalid data in the memory banks are rewritten as null data after the valid data are read, noise due to error correction can be more properly prevented.

Moreover, even if an E/D ID is erroneously detected, since invalid data in other than a valid data recording region of the memory is null data, occurrence of noise can be easily suppressed, thereby improving the reliability.

The above, and other, objects, features and advantage of the present invention will become readily apparent from the following detailed description thereof which is to be read in connection with the accompanying drawings.

BRIEF DESCRIPTION OF THE DRAWINGS

FIG. 6 is a schematic diagram showing an example of interleaving on a track of data;

FIG. 7 is a schematic diagram showing an example of interleaving among tracks of data;

FIGS. 8A and 8B are block diagrams showing a digital signal reproducing apparatus according to an embodiment of the present invention;

FIG. 9 is a block diagram showing a reproduction signal processing portion according to an embodiment of the present invention;

FIG. 10 is a schematic diagram showing signal wave of reproduced at +2.1 times speed for sine wave;

DETAILED DESCRIPTION OF THE PREFERRED EMBODIMENTS

Next, with reference to the accompanying drawings, an embodiment of the present invention will be described. The description will be made in the following order.

Figure 4:
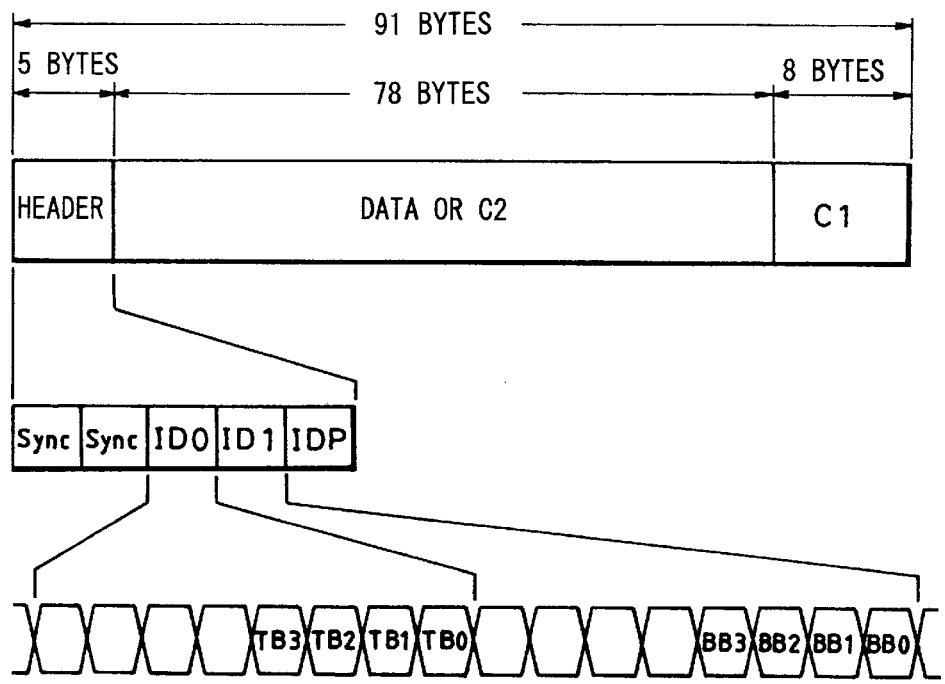
FIG. 4 is a schematic diagram showing an example of one block of data.

(1) Example of structure of block
(2) Example of structure of track
(3) Example of interleaving on track
(4) Example of interleave among tracks
(5) Example of entire block construction of digital signal recording apparatus
(6) Example of block construction of reproduction signal processing portion
(7) Example of description of operation of memory banks
(1) Example of structure of block FIG. 4 is a conceptual schematic diagram showing an example of the structure of one block of record data. One block is composed of a header portion, a main data portion, and a C1 parity portion. The header portion is positioned at the beginning of the block and composed of a block sync (Sync)(two bytes), header IDs (ID0 and ID2) (two bytes), and a header ID parity (one byte). Thus, the header portion is composed of a total of five bytes. A track ID number (1 to 10) is written to the low order four bits of the header ID0. A block ID number (1 to 14) is written to the low order four bits of the header ID1.

The main data portion (hereinafter referred to as data portion) is composed of 78 bytes. Data and C2 parity are written to the data portion. At the beginning of the data portion, there is a region in which an ID signal that identifies whether data recorded in a frame portion is E data frame (excess data frame) or D data frame (diminished data frame). The C1 parity portion is composed of eight bytes. Thus, one block is composed of 91 bytes. At the beginning of the data portion, an E/D ID that identifies whether the number of samples in the frame portion being recorded is E data or D data is written.

(2) Example of structure of track

Figure 5:
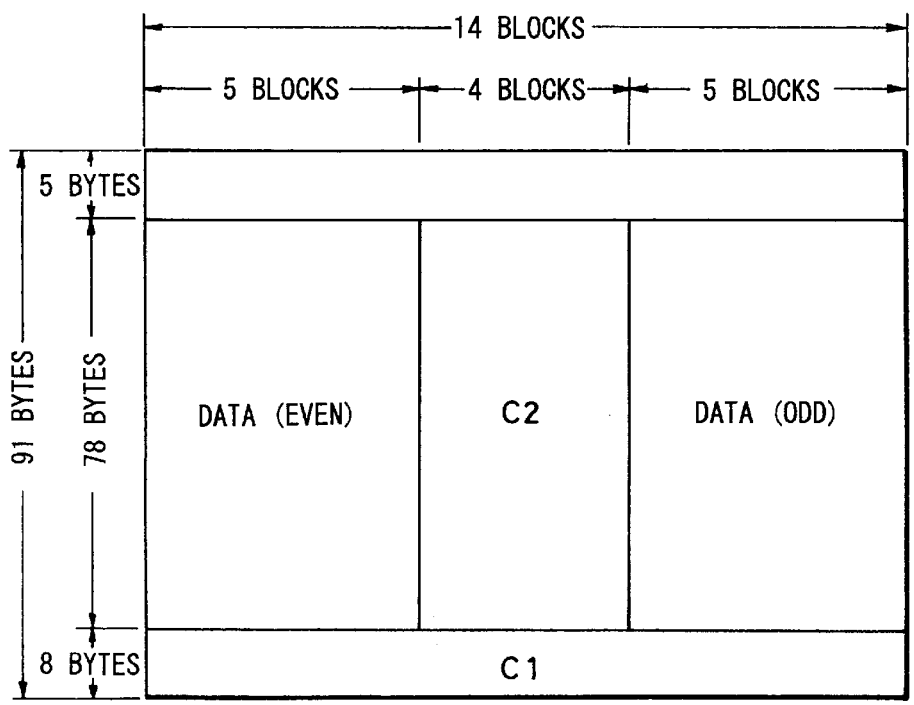
FIG. 5 is a schematic diagram showing an example of one track of data.

FIG. 5 is a conceptual schematic diagram showing an example of the structure of data of one track. One track is composed of a first data portion (five blocks), a C2 parity portion (four blocks), and a second data portion (five blocks). Thus, one track is composed of a total of 14 blocks.

Even number data on L and R channels are positioned in the data portion at addresses BA1 to 5(hereinafter, these data are referred to as even number sequence). Odd number data on L and R channels are positioned in the data portion at addresses BA10 to 14(hereinafter, there data are referred to as odd number sequence). A parity that is interleaved in the direction of block addresses BA is placed in position of the C2 parity portion at addresses BA6 to 9. One frame is composed of 10 tracks in the above-described structure.

(3) Example of interleaving on track

FIG. 6 is a conceptual schematic diagram showing an example of interleaving of data recorded on a track. For simplicity, only track TR1 will be described. In FIG. 6, five blocks of the first data portion and five blocks of the second data portion are shown. Four blocks of the C2 parity portion are omitted. As described above, data on L channel is written to track TR1. The regions surrounded by solid lines in FIG. 6 represent ID regions. In each of the ID regions, E/D ID, sampling frequency fs, number of quantizing bit Qu, and so forth are written.

In FIG. 6, the vertical direction and the horizontal direction are defined as symbol address SA direction and block address BA direction, respectively. With respect to data L0, the data sequence in the symbol address SA direction is L0, L50, L100, L150, L200, . . . , and so on. Thus, the interleave length in the symbol address SA direction is 50 samples.

Likewise, with respect to data L0, the data sequence in the block address BA direction is L0, L10, L20, L30, L40, . . . , and so on. Thus, the interleave length in the block address BA direction is 10 samples. The interleave lengths in the symbol address SA direction and in the block address BA direction are the same as those of data of even number sequence, odd number sequence, and other track TR data.

Now, as described above, it is assumed that the standard number of samples is 1602 and that the numbers of samples of IDs (f1, f2) of two bits are represented as follows.

(0, 0) : 1582 (number of D2 data)
(0, 1) : 1592 (number of D1 data)
(1, 0) : 1612 (number of E1 data)
(1, 1) : 1622 (number of E2 data)

When the frequency of the reference signal that is recorded is the same as the frequency of the reference signal that is reproduced, it is not necessary to designate the number of samples other than the standard number of samples. However, when a digital interface input is considered, the sampling frequency may deviate for around ±1000 ppm. Thus, the number of samples should be designated so that it can absorb such deviation. When the sampling frequency fs is 48 kHz, the deviation of ±1000 ppm becomes 48.048 kHz (+1000 ppm) to 47.952 kHz (−1000 ppm). Thus, the number of samples should be designated with proper tolerance.

Now, it is assumed that the standard number of samples is 1602, the number of E data is 1612, and the number of D data is 1592. In this case, when the frequency of the reference signal is 29.97 Hz, the sampling frequency fs of the number of E data is represented as follows.

$$29.97 \text{ (Hz)} \times 1612 = 48.31 \text{ (kHz)} > 48.048 \text{ (kHz)}.$$

The sampling frequency fs of the number of D data is represented as follows.

$$29.97 \text{ (Hz)} \times 1592 = 47.71 \text{ (kHz)} < 47.952 \text{ (kHz)}.$$

Thus, the deviation of ±1000 ppm can be absorbed.

Individual data are interleaved and written to corresponding tracks. At this point, in non-data regions, null data (00H) is written. Regions at BA5 and SA7 and at BA14 and SA7, an ID signal generated by an E/D ID generating circuit (that will be described later) is written.

(4) Example of interleaving among tracks

Figure 7:
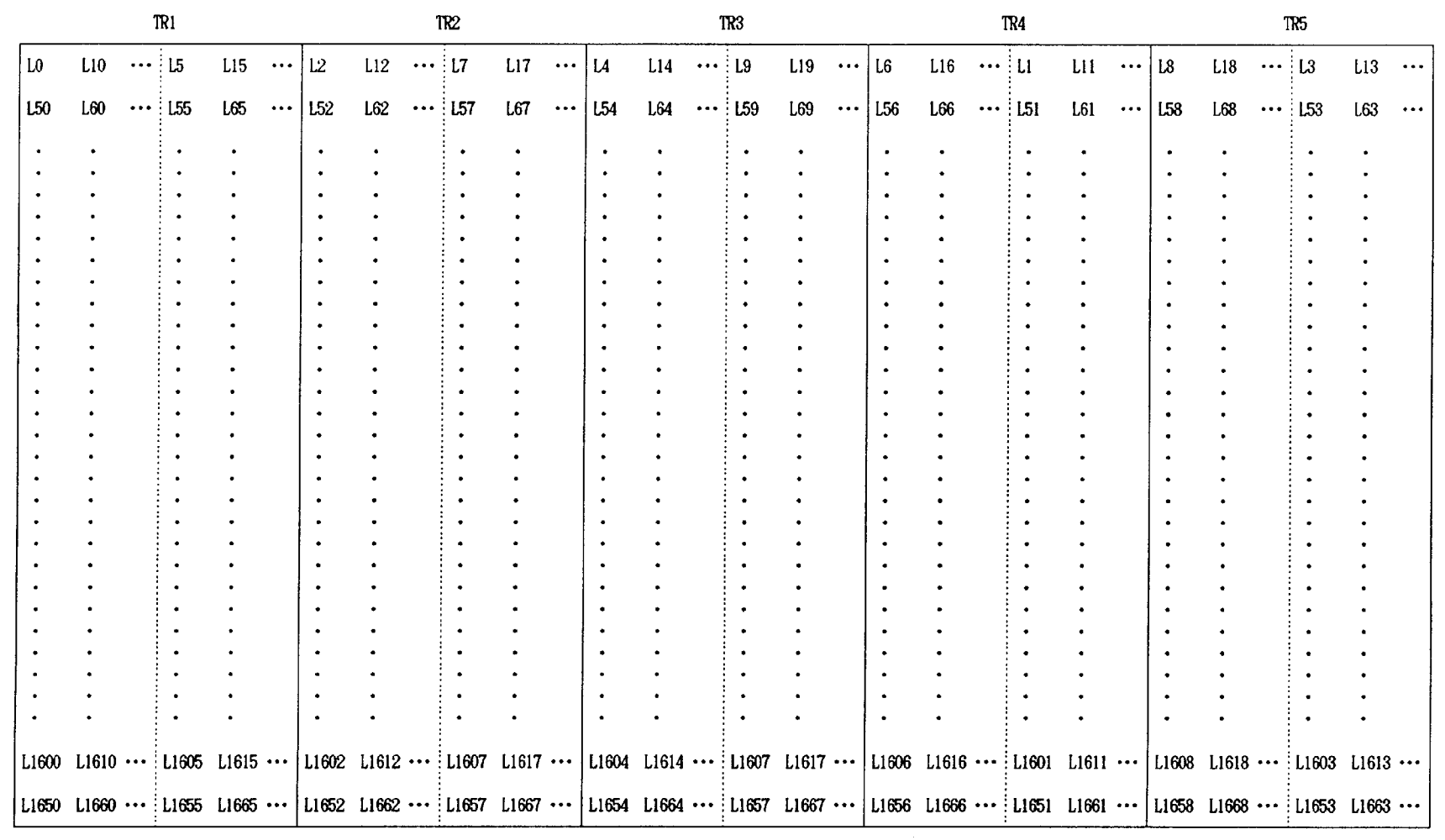

FIG. 7 is a conceptual view showing an example of interleaving of data recorded among tracks. With respect to data L0 of the even number sequence on track TR1, the data sequence on tracks is L0, L2, L4, L6, L8, . . . , and so on. Thus, the interleave length between each track is two samples.

With respect to data L5 of the odd number sequence on track TR1, the data sequence on tracks is L5, L7, L9, L1, L3, . . . , and so on. Thus, the data L9 is followed by the data L1. However, when the conception of remainder is employed, the interleave length between each track is two samples. Thus, it is clear that data are regularly interleaved.

(5) Example of entire block construction of digital signal recording apparatus

Figure 8A:
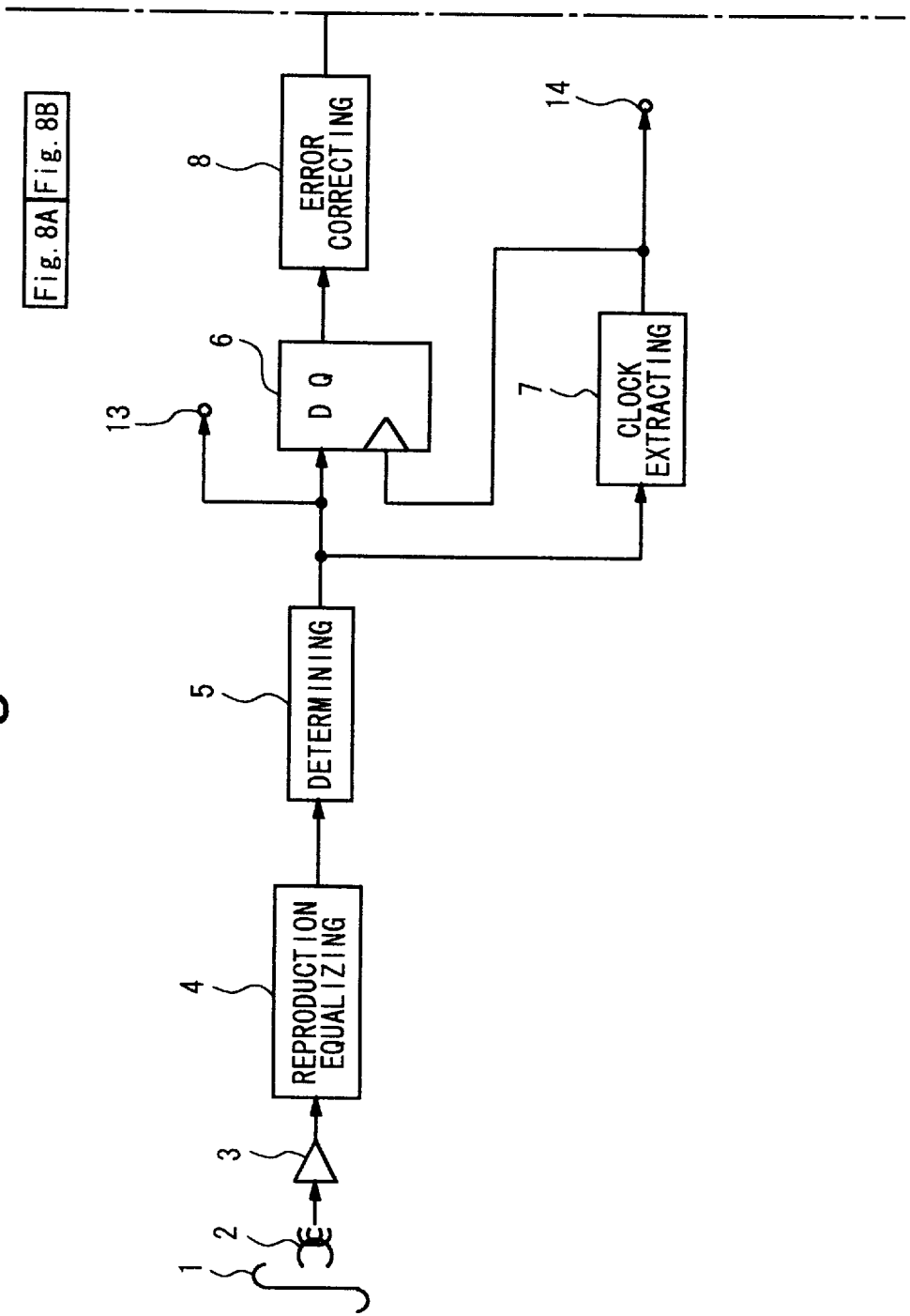

FIGS. 8A and 8B are block diagrams showing the construction of a digital signal reproducing apparatus according to the present invention. Next, with reference to FIGS. 8A and 8B, the operation of the digital signal reproducing apparatus will be described. On a magnetic tape 1, sound data that has the data structure described in (1) to (5) and that has been interleaved is recorded. The data recorded on the magnetic tape 1 is reproduced by a magnetic head 2 and amplified by a reproducing amplifier 3.

The wave form of the data amplified by the reproducing amplifier 3 is equalized by a reproduction equalizing portion 4. Thereafter, the equalized data is digitized by a data determining comparator 5. The digitized data is supplied to a reproduction data strobe portion 6, a reproduction clock extracting portion 7, and an output terminal 13. The digitized data is supplied to a video signal processing portion (not shown) through an output terminal 13. The reproduction clock extracting portion 7 extracts a reproduction clock from the supplied data and supplies the reproduction clock to the reproduction data strobe portion 6 and an output terminal 14. The reproduction data strobe portion 6 outputs the data supplied from the data determining comparator 5 to an error correcting portion 8 in synchronization with the reproduction clock supplied from the reproduction clock extracting portion 7.

The error correcting portion 8 generates an error correction flag, an interpolation flag, and so forth and supplies them to a reproduction signal processing portion 10. The reproduction signal processing portion 10 performs various data processes such as deinterleaving process, interpolating process, data time expanding process, E/D ID detecting process, and memory data clearing process trough a memory 9. The data processed by the reproduction signal processing portion 10 is supplied to a D/A converting portion 11. The converted data is output as a sound signal from an output terminal 12.

(6) Example of block construction of reproduction signal processing portion

FIG. 9 shows an example of the construction of the reproduction signal processing portion 10. Next, with reference to FIG. 9, the operation of the reproduction signal processing portion 10 will be described. Signals such as an error correction flag and an interpolation flag supplied from the error correcting portion 8 through an input terminal 21 are supplied to a track/block address detecting portion 22. The track/block address detecting portion 22 detects an address that identifies each data block, controls a data write address generating portion 23 corresponding to the detected signal, and generates an address in such a manner that data is written to a predetermined region of the memory 9. Data supplied from the input terminal 21 is sent to a data bus DB through a data write buffer 32 and then written to the memory 9. The data write address is sent to an address bus AB through a write address buffer 33.

A data read address generating portion 26 generates a deinterleave address and outputs data that is supplied to the address bus AB through the read address buffer 38, expanded on time axis, and read through the data read buffer 39 to a D/A converting portion 11. The D/A converting portion 11 outputs the D/A converted sound signal through an output terminal 12.

An E/D ID read address generating portion 25 generates an address so that an E/D ID is read in a data read region. The address is supplied to the address bus AB through an E/D ID read address buffer 36. The E/D ID identifies one of frames E1, E2, D1, and D2. The E/D ID is read through an E/D ID read buffer 37. A counter in the data read address generating portion 26 is controlled so that samples in the signal process frame region are read corresponding to the ID.

After samples of data corresponding to the detected E/D ID are read, an error flag ON/00H data write address generating portion 27 operates. The operated error flag ON/00H data write address generating portion 27 is supplied to the address bus AB through the 00H data write address buffer 34. The error flag ON/00H data generating portion 28 writes <00H> data to the memory 9 through the 00H data write buffer 35 and the data bus DB so that data that sets the generated error flag and all reproduced data become null data. Thus, since <00H> data is written to the data portion of tracks that have not been reproduced by the magnetic head 2, ragged noise is not output. When there is a loss of the reproduction RF signal as in the variable reproduction mode and thereby the reliability of the interpolation flag supplied from the error correcting portion is low, even if the error flag has been set, since the <00H> data is written, the noise is suppressed and the reliability is improved.

Figure 1A:
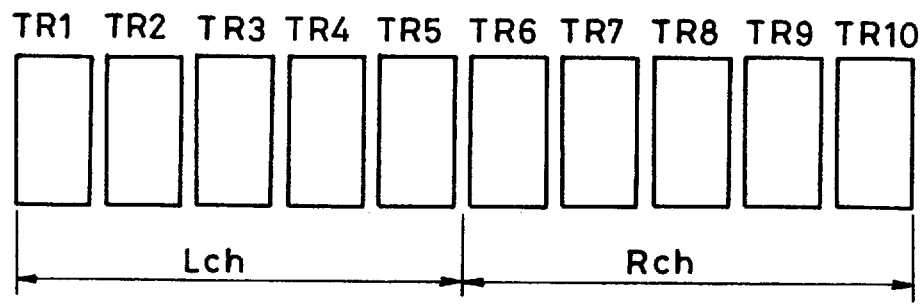
FIGS. 1A and 1B are schematic diagrams showing an example of one frame of data.
Figure 1B:
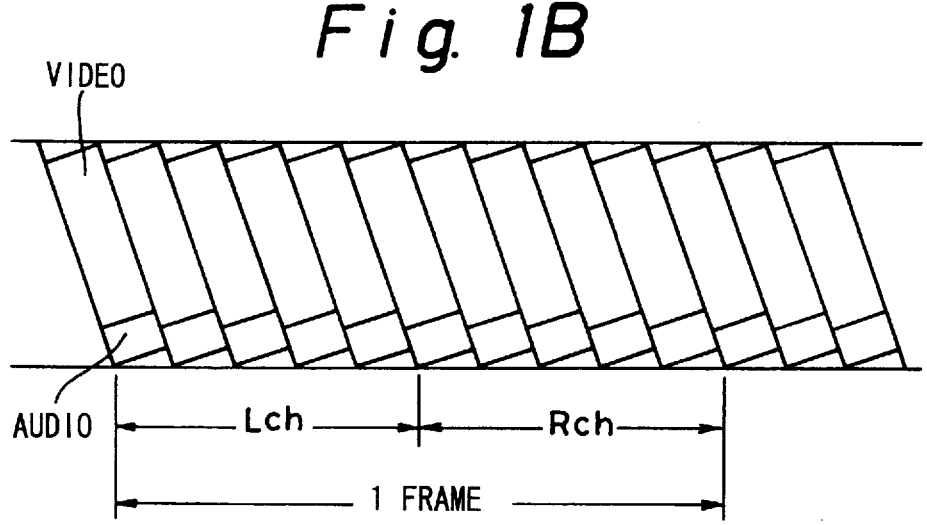
Figure 2:
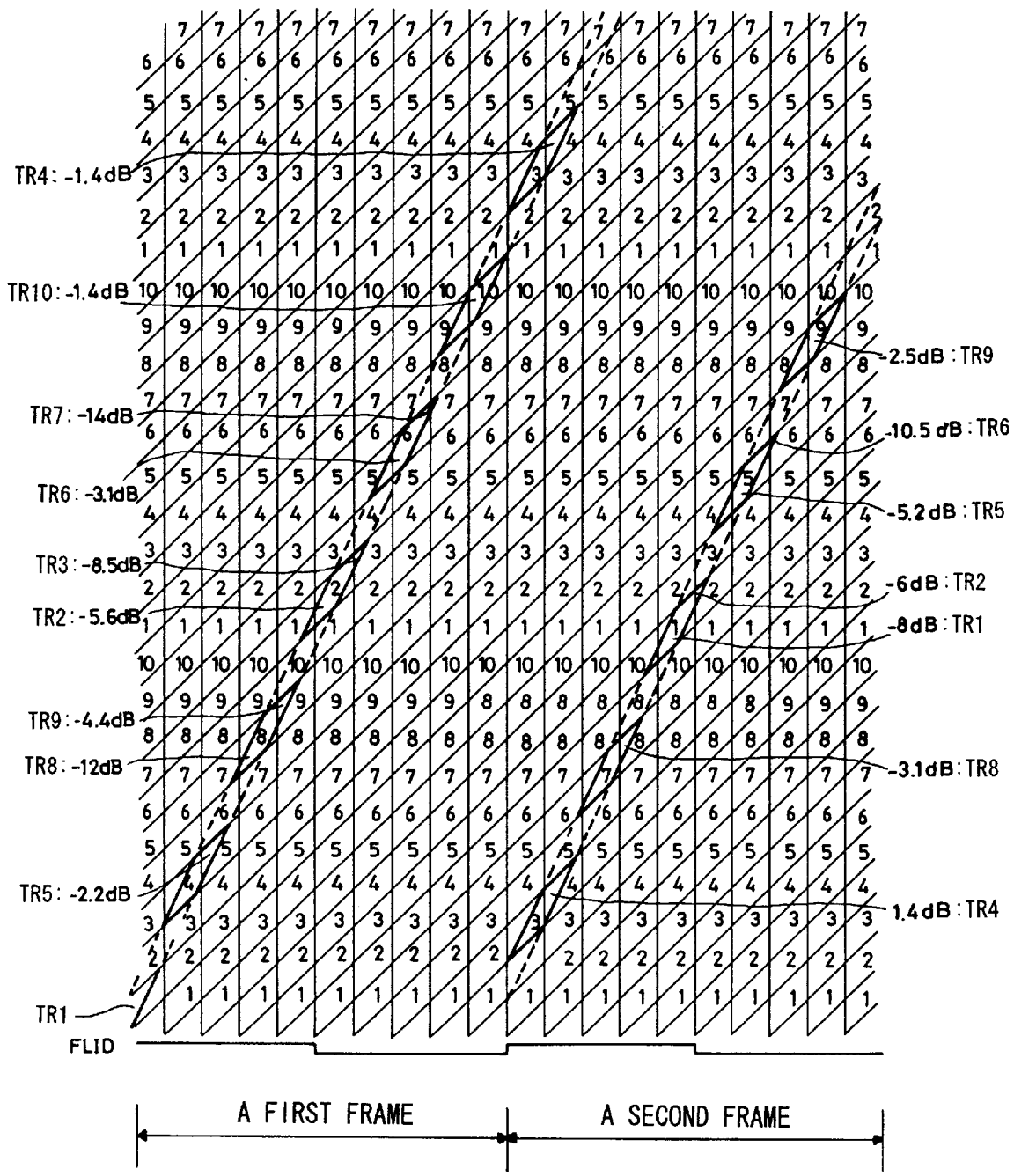
FIG. 2 is a schematic diagram showing an example of a reproduction RF signal in a variable speed reproduction mode corresponding to track pattern coordinate method.
Figure 3:
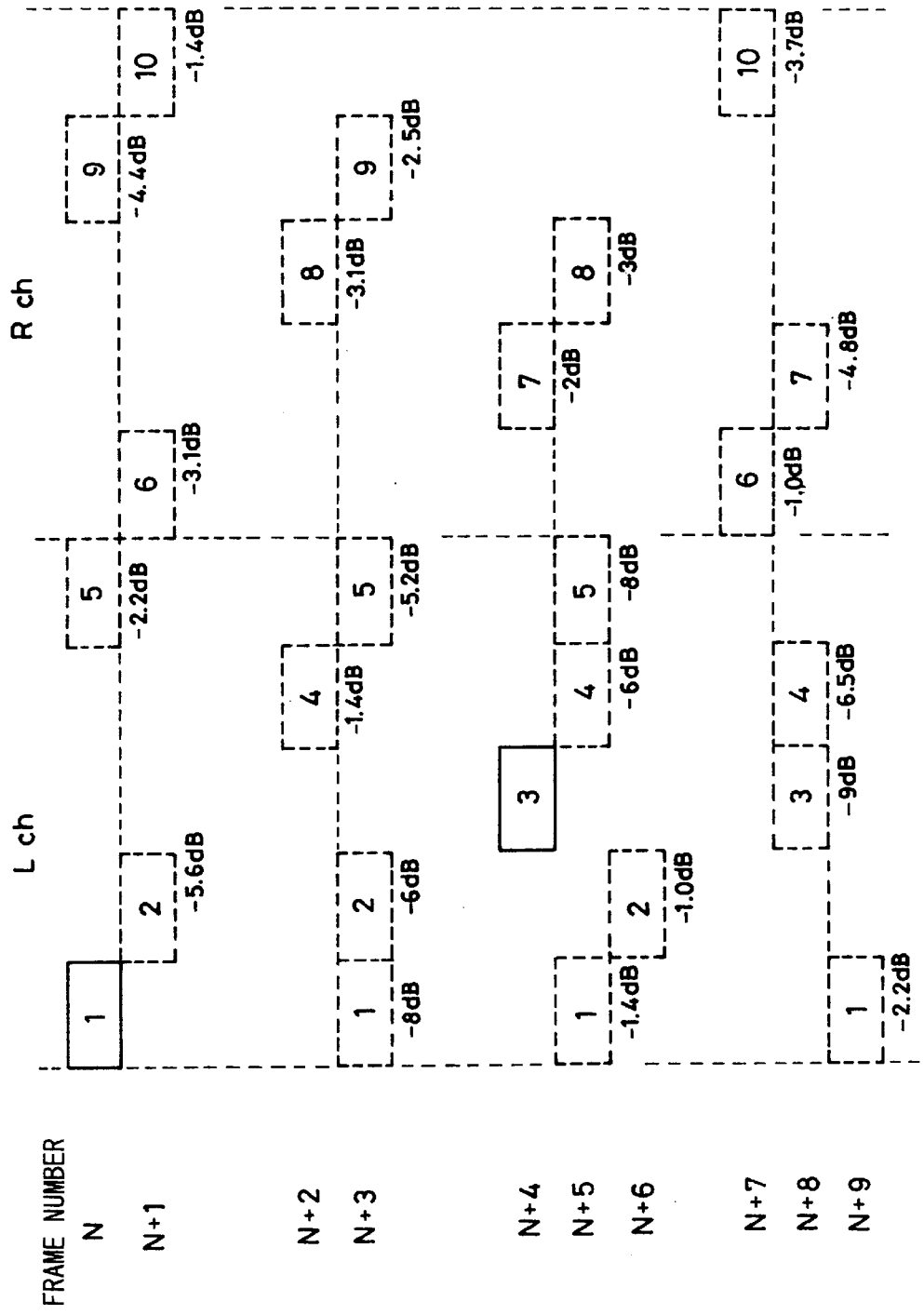
FIG. 3 is a schematic diagram showing an example of the level of a reproduction RF signal in the variable speed reproduction mode.

Even if data in different frames are reproduced in variable speed reproduction mode, the track/block address detecting portion 22 writes data to a predetermined data region corresponding to the detected address. Referring to illustrations representing reproduction signals corresponding to track pattern coordinate method shown in FIGS. 2 and 3, it is clear that data of one or two frame ahead is reproduced in the +2.1 times speed reproduction mode. In this embodiment, as described above, the length of interleaving between each track is two samples. Reproduction data in different frames at the sample data interval are deinterleaved.

When a sound with a delay and a sound without a delay are added, the resultant signal is heard as an echo sound. In the signal process of the present invention, the same effect occurs. Even if an echo sound takes place in a signal, it is more easily recognized than the case of no data. FIG. 10 is a conceptual schematic diagram showing signal wave of reproduced at +2.1 times speed for sine wave. This diagram represents L channel. Reference numeral 1 to 5 represents track number respectively. Block dots represent sample data that will be reproduced. It will be understood that data similar to that of obtained in normal reproduction mode can be reproduced, although data of 3 frame regions are mixed in frame region of (N+4). If the reading rate of the memory is normal, the pitch of reproducing signal becomes high. Then the reading rate of the memory is reduced to make the pitch of the signal equal to that of normal reproducing mode as a simple manner.

As described above, after data is expanded on time axis, data in the memory 9 is all <00H>. Data portion that is not reproduced becomes no-sound portion. In addition, data that is deinterleaved is always data of one or two frames ahead. Thus, as a sound signal, remarkably strange feeling does not take place.

(7) Example of description of operation of memory bank

Figure 11:
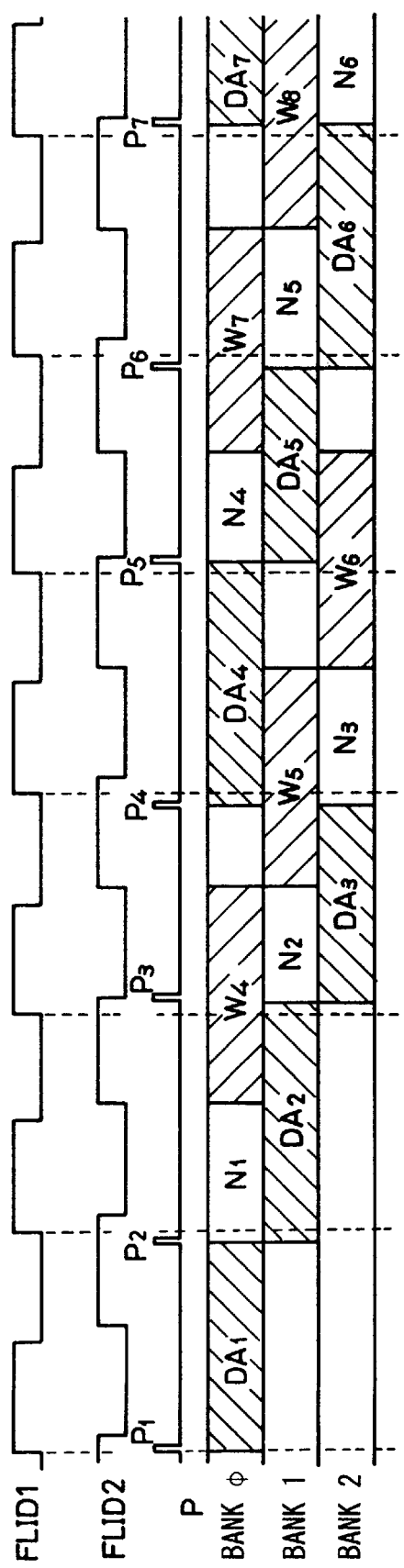
FIG. 11 is a schematic diagram for explaining an example of the operation of a three-bank type memory according to the present invention.

FIG. 11 is a timing chart for explaining an example of the operation of banks of a memory in the reproduction signal processing portion according to the present invention. In FIG. 11, for simplicity, the operation in the case of three banks will be described. Data is written at a frame region corresponding to FLID2 that synchronizes with frame reference signal FLID1. A read counter pulse P is generated after an address at which the last sample data is read in the frame is output. Thus, the position of the read counter pulse P varies depending on the E/D ID. However, the position of the read counter pulse P is present in the vicinity of the leading edge of the frame reference signal FLID1. The data at the frame region is extended on time axis in the period of the read counter pulse P. The resultant data is read from the memory and then A/D converted.

Next, the operation of banks at several frame regions will be described. The memory has three banks 0 to 2. Each bank should have the storage capacity that can store at least the number of samples of E2 data, E/D ID, interpolation flag, and so forth. Now, it is assumed that the number of samples of the E2 data is 1622, the number of quantizing bits is 16, and the number of channels is two (L/R). In this case, the number of bits required for three banks of the memory can be represented as follows.

$3 \times 1622 \times 2 \times 16 = 155712$ (bits)

Thus, with only one 256 kbit memory, all required data including IDs can be stored. As the storage capacity of the memory increases, the number of banks increases. In addition, the lip sync delay amount between the sound signal and the image signal can be increased.

Now, it is assumed that data of bank 0 is read and the data is D/A converted. This region is DA1. DA1 is D data. A read counter pulse P2 is positioned slightly on the left of the leading edge of the frame reference signal FLID1. The next reading region is DA2 of bank 1 of the memory. Data is read after the read counter pulse P2.

The DA1 region of bank 0 is followed by an N1 region. At the N1 region, the error flag is set and sound data is rewritten as <00H>. The N1 region is followed by a W4 region. In the variable speed reproduction mode, only reproduced data is written. The length of data write region is the length of the region of the period of the frame reference signal. Such data read/write operations are repeated for banks 0 to 2.

Figure 12:
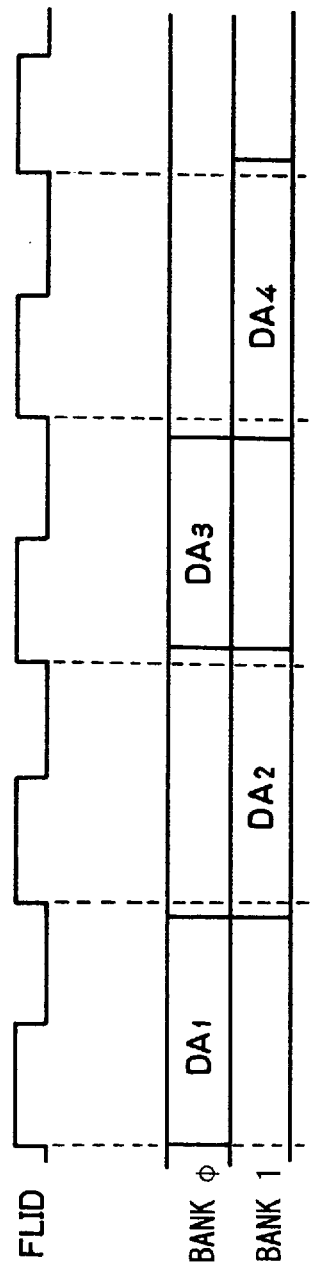
FIG. 12 is a schematic diagram for explaining an example of the operation of a two-bank type memory.

FIG. 12 is a conceptual schematic diagram showing the operation of a two-bank type memory. As shown in this diagram, in the two-bank type, since the data read region and the D/A converting region are not constant, the data read region may overlap with the write region. For example, while D data of DA3 of bank 0 is being read and D/A converted, data of bank 1 is written. Thus, the read region may overlap with the write region.

In this embodiment, when the phase of the data write reference signal FLID2 is varied in such a manner that it does not overlap with the data read region, a lip synchronization between an image signal and a sound signal can be established. When the number of banks is increased, the variable range can be easily increased.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A digital signal reproducing apparatus operated in a variable speed reproduction mode for reproducing adjacent sample sequence data interleaved on non-adjacent tracks of a tape and having a non-integer relation between a sampling frequency of a digital information signal to be recorded and an inner interleave reference signal frequency comprising:

signal process memory means for dividing a memory region into a plurality of regions and writing/reading the adjacent sample sequence data reproduced from said tracks to/from the divided memory regions, wherein reproduced adjacent sample sequence data beyond a predetermined signal level of several interleaving regions is stored for utilization as an audio signal in said variable speed reproduction mode;

means for detecting an error flag reproduced from said tracks representing that a number of data in a respective track region is too excessive or too small and should be null data; and means for ignoring said data reproduced from said respective track region except said error flag when said error flag is detected and rewriting said data as null data to a respective region of said memory region after a predetermined number of adjacent sample sequence data corresponding to the detected error flag is reproduced.

2. The digital signal reproducing apparatus as set forth in claim 1, further comprising:

means for detecting an address that represents a data sequence of blocks or symbols and writing the data to the memory according to the detected address when a variable speed reproduction is performed;

means for deinterleaving the data written in the memory regardless of whether the data is at the same interleave region; and means for interpolating the data read from the memory corresponding to the error flag when the data is read by the signal process memory means.

3. The digital signal reproducing apparatus as set forth in claim 2, further comprising:

means for generating addresses at a varying rate to read the data written in the memory reproduced at a variable speed reproduction.

4. The digital signal reproducing apparatus as set forth in claim 3, further comprising means for reproducing the data on the tape arranged according to a first data portion, a second data portion, a first parity, and a second parity.

5. The digital signal reproducing apparatus as set forth in claim 4, wherein the first parity is arranged on the tracks between the first data portion and the second data portion and the second parity is arranged on the tracks after the second data portion.

6. The digital signal reproducing apparatus as set forth in claim 5, wherein the memory region is composed of a plurality of data banks and a reproduced signal is recorded by said signal process memory means in the data banks with reference to a first field and a second field of the reproduced signal.

7. The digital signal reproducing apparatus as set forth in claim 6, wherein the data is recorded in the banks starting at the beginning of the first field.

8. The digital signal reproducing apparatus as set forth in claim 7, wherein said data banks comprise at least three data banks, data of the first field and the second field being successively recorded therein, the data being recorded in each of the banks at a transition between the first field and the second field.

9. The digital signal reproducing apparatus as set forth in claim 1, wherein said adjacent sample sequence data represents an RF signal having ragged noise, wherein said means for ignoring, responsive to said means for detecting an error flag, is operative to rewrite said ragged noise as said null data to said respective region of said memory thereby suppressing said ragged noise and improving reliability.

* * * * *